(12) United States Patent
Sigel et al.

(10) Patent No.: US 8,120,829 B1
(45) Date of Patent: Feb. 21, 2012

(54) SYSTEM AND METHOD FOR REAL TIME HOLOGRAPHIC DATA RECORDING AND READOUT

(75) Inventors: Christophe N. Sigel, Broomfield, CO (US); Michael L. Leonhardt, Longmont, CO (US)

(73) Assignee: Oracle America, Inc., Redwood, CA (US)

( * ) Notice: Subject to any disclaimer, the term of this patent is extended or adjusted under 35 U.S.C. 154(b) by 245 days.

(21) Appl. No.: 11/409,861

(22) Filed: Apr. 24, 2006

(51) Int. Cl.
*G03H 1/22* (2006.01)
*G03H 1/12* (2006.01)

(52) U.S. Cl. ............... 359/32; 359/22; 359/25; 359/35; 359/11; 369/103

(58) Field of Classification Search .............. 359/16, 359/10, 32, 11, 22, 35; 369/103
See application file for complete search history.

(56) References Cited

U.S. PATENT DOCUMENTS

| | | | |
|---|---|---|---|
| 5,703,705 A | 12/1997 | Curtis et al. | |
| 5,949,558 A | 9/1999 | Psaltis et al. | |
| 6,788,443 B2 | 9/2004 | Ayres et al. | |
| 6,806,982 B2 * | 10/2004 | Newswanger et al. | 359/35 |
| 6,862,120 B2 * | 3/2005 | Tanaka et al. | 359/7 |
| 7,023,786 B2 * | 4/2006 | Itoh et al. | 369/103 |
| 7,289,255 B2 * | 10/2007 | Baba et al. | 359/35 |
| 2004/0179251 A1 | 9/2004 | Anderson et al. | |
| 2006/0221419 A1 * | 10/2006 | Yoshikawa et al. | 359/21 |

OTHER PUBLICATIONS

W. Smothers, et al., Photopolymers for Holography, SPIE vol. 1212 Practical Holography IV (1990).
L. Dhar, et al., Recording Media That Exhibit High Dynamic Range for Digital Holographic Data Storage, Opics Letters, vol. 24, No. 7, 1999.

* cited by examiner

*Primary Examiner* — Audrey Y Chang
(74) *Attorney, Agent, or Firm* — Brooks Kushman P.C.

(57) ABSTRACT

A method for holographic data recording and simultaneous data readout without requiring additional optical power for readout illumination is provided. The method comprises reflecting a transmitted portion of a data light beam or of a reference light beam used for holographic recording of data in a holographic data storage medium. The reflected beam is configured to illuminate the holographic data storage medium from the opposite side with a polarization orthogonal to that of the recording beams, such that it provides a counter-propagating readout beam for real-time readout of currently being recorded hologram. Readout beam may also be configurable for accessing any one of the at least one previously recorded holograms. Systems using the methods of the invention are also provided.

19 Claims, 7 Drawing Sheets ary,120,829 B1

SYSTEM AND METHOD FOR REAL TIME HOLOGRAPHIC DATA RECORDING AND READOUT

BACKGROUND OF THE INVENTION

1. Field of the Invention

The present invention relates to systems and methods for holographic recording and readout of data, and in particular, to write verification of holographically written data. The present invention further relates to systems and methods for implementing additional optical processing functions, such as optical pre and/or post-processing steps required in certain holographic storage media.

2. Background Art

Holographic data storage ("HDS") is a form of optical data storage, whereby recording of data is achieved by illuminating a photosensitive medium with intersecting reference and data light beams. The spatial modulation of light intensity produced by interference of the beams is recorded in a holographic data storage medium by modification of the dielectric properties of the medium, either in the form of periodic spatial modulation of the refractive index of the medium or of the absorption of the medium, to constitute a grating or a hologram. One form of holographic data storage sequentially records localized holograms each containing a single bit, and is sometimes termed micro holographic bit storage. Another form of holographic data storage comprises volumetric page holographic recording which allows a large amount of data to be recorded in parallel in the form of a 2 dimensional bit array or data page. This is accomplished by placing a spatial light modulator in the optical path of the data light beam. The spatial light modulator imparts a data page on the data light beam by modulating its spatial profile.

It is also well known in the prior art that multiple data holograms can be recorded within a same recording volume by means of one of a plurality of multiplexing techniques. The techniques generally involve changing one of the properties of the reference beam used to record each data hologram such that the data can be selectively retrieved only by illumination of its data storage location in the holographic data storage medium by its associated reference beam. Detection is typically performed by imaging the optical data signal upon a suitable photodetector, which may comprise a single photodetector for detecting single bit signal or a two dimensional photodetector array for detecting a two dimensional data page.

As in all digital storage methods, holographic data storage typically requires methods for write verification. In particular, such methods of verifying holographically written data must minimize degradation of storage capacity and data rate while ideally providing bit-level verification and also enabling maximum usage of existing optical elements and laser power sources. Data readout after writing accomplishes bit-level data verification, but this method halves the effective data write rate. Other methods have been proposed for write verification of holographically written data, but suffer from one or more disadvantages. For example, U.S. Pat. No. 6,788,443 discloses the use of associative readout by illumination with a single data beam of all the multiplexed holograms, which each simultaneously produce a diffracted signal along the path of its recording reference beam proportional in amplitude to a spatially integrated correlation product between the readout and recorded data pattern. The "associative readout" method can thus simultaneously readout all co-located data holograms: but requires additional detection and signal processing means. Furthermore, in the case of data page holograms, detection of diffracted signal intensities does not allow actual bit-level data verification due to the spatial integration process, but rather provides an average signal to noise ratio, which in the case of intra-page non uniform degradation effects is not an adequate measure of worst case bit error rate. In another prior art example, U.S. Pat. No. 6,956,681 discloses the use of a polarization offset, of recording reference beam with respect to a polarization of recording data beam during writing. Orthogonal polarization component of reference beams does not interfere with recording data beams, but diffracts off of data hologram being recorded. Subsequent detection of the offset polarized diffracted data beam provides a means for real time monitoring of data diffraction efficiency, but diverts a portion of the total recording power for readout, and also requires additional polarization separation and detection means.

Another significant problem of real time monitoring (reading) during data recording is that the media's photoactive species responsible for recording are equally affected by any additional optical exposure for readout. Thus, any data readout process intervening between successive data recording sequences effectively reduces the number of remaining species available for recording and, correspondingly, the photosensitivity of the medium with regard to subsequent data recording, thus degrading both the effective data write transfer rate, as well as the total storage capacity of the media.

Holographic data storage systems may employ several different configurations for recording and readout of data hologram, such as transmissive or reflective hologram recording geometries with recording beams incident upon same and opposite sides of the holographic data storage medium, respectively. Holographic data readout may be achieved using a reference beam identical to recording reference beam. Another prior art holographic data readout configuration comprises a phase conjugate readout arrangement, whereby a reference beam generally identical to, but propagating in opposite direction to recording reference beam is employed. In this case reconstructed data signal is diffracted along the same path as but in opposite direction to recording data beam, thus resulting in a more compact system. Further background information on holographic storage may be found in Geoffrey W. Burr, Holographic Storage, Encyclopedia of Optical Engineering, Marcel Dekker, Inc., 2003, and references contained therein. Based on the aforementioned limitations of the existing art, improved methods and systems for verifying holographically recorded data are needed, that can further reduce degradation of storage capacity and effective write data rate, provide bit level data verification and also enable maximum usage of existing optical elements and laser power sources.

SUMMARY OF THE INVENTION

The present invention solves one or more problems of the prior art by providing methods for holographic data recording and simultaneous data readout without requiring additional optical power for readout illumination. The general principle of the invention comprises reflecting a transmitted portion of at least one of a data light beam and a reference light beam used for holographic recording of data in a holographic data storage medium. The reflected at least one beam forms at least one additional illumination beam incident upon holographic data storage medium from the opposite side to that of the reflected at least one of the transmitted recording beams. The reflected at least one additional illumination beam is redirected to illuminate at least one of the currently being recorded to region and a different region of the holographic data storage medium. In certain embodiments of the invention, the reflected at least one additional illumination beam illuminates the currently being recorded to region with a polarization orthogonal to that of recording beams for providing a counter propagating readout beam for illuminating the at least one previously and currently being recorded holograms. In certain embodiments, the at least one reflected beam comprises the reference beam, and reflection path may be controlled to vary the incidence angle to provide phase conjugate readout of any one of the at least one angular multiplexed previously or currently being recorded data holograms. In other embodiments, the at least one reflected beam may be the data beam, and the reflected beam is reflected along the same path for producing phase conjugate correlative readout of previously recorded holograms. The reflected beam may comprise a reference pattern with a known degree of correlation to each of recorded data hologram. The methods of the invention provide at least one of real time data readout and real time simultaneous correlative readout functionalities which provide both single bit and average bit error rate determination for write verification. When implemented within a page based holographic data storage system, the methods of the invention enable either bit level or integrated data page verify, or simultaneous correlative write verify. Depending on the readout configuration (direct or phase conjugate) of the holographic system, the system may use existing detection, or incorporate additional detection of either phase conjugate data page or correlation signals. The methods of this embodiment advantageously reduce optical complexity and the amount of laser power required by a fully functional holographic data storage system.

In yet another embodiment of the present invention, at least one of the at least one transmitted recording beam is reflected and directed onto at least one region different from current recording region of holographic data storage medium for performing additional photo-induced processing functions required by a holographic data storage medium. The at least one different illuminated by at least one reflected light beam region of the holographic data storage medium may comprise one of a previously unexposed region or a fully recorded region of the holographic data storage medium that may require one of optical exposure for pre sensitization in preparation for holographic recording of data and of optical exposure for depletion of remaining optical active elements after holographic data recording. The present embodiment provides a significant improvement over current implementations of media pre and post processing steps, by providing means for concurrent data recording and photo processing of different regions on media without requiring additional optical power or light sources, processing and data recording using light with similar wavelength.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

Figure 1:
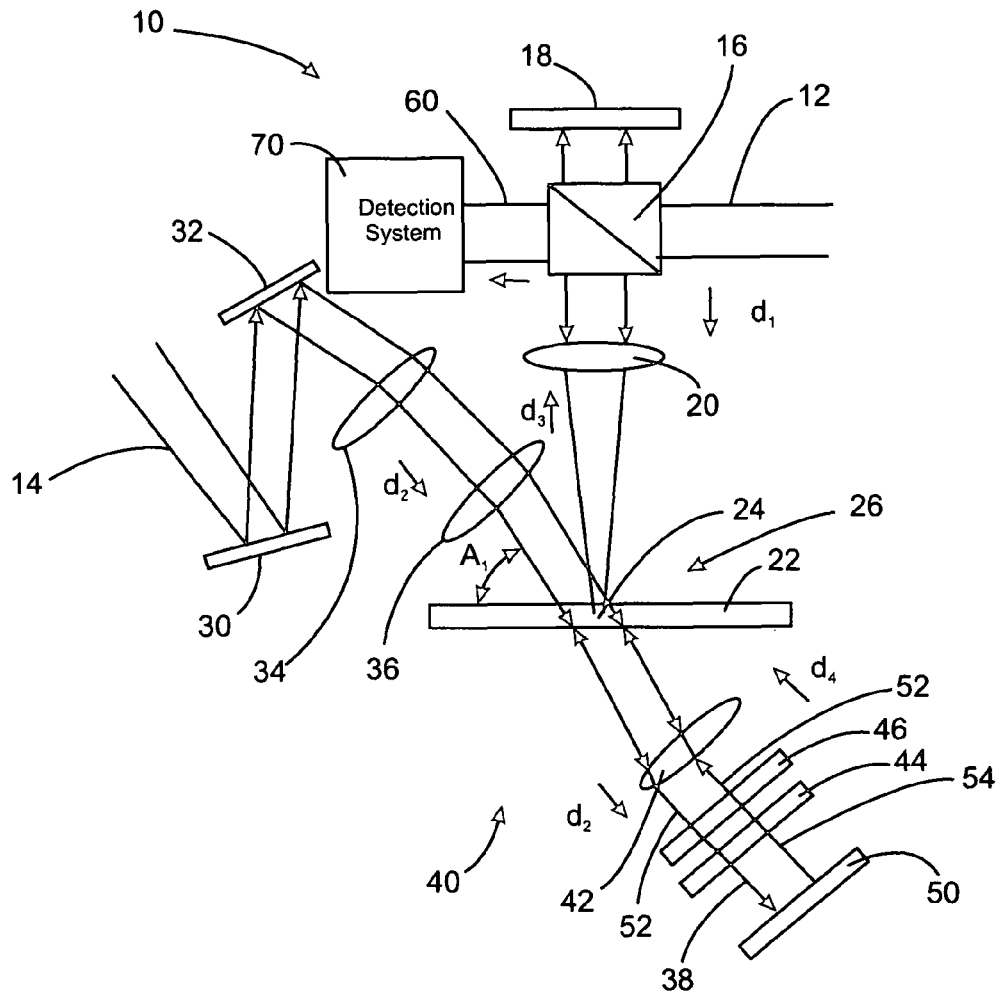
FIG. 1 is a schematic of an embodiment of the invention using a back reflected reference light beam for write verification having the same angle of incidence as the reference light beam.

With reference to FIG. 1, a schematic of an embodiment of the invention using a reflected reference light beam for real time data readout and write verification is provided. Holographic data recording system 10 includes data light beam 12 and reference light beam 14 which can both be generated from the same light source (not shown) using a beam splitter to divide an initial light beam into data light beam 12 and reference light beam 14. Data light beam 12 passes through polarization beam splitter 16 and is reflected onto a spatial light modulator (SLM). SLM 18 comprises an array of independently controllable pixels that are capable of modulating the spatial profile of data light beam 12. Depending on the configuration of use and the particular type of modulator or modulator array, the phase and/or amplitude of data light beam 12 can be modulated. Accordingly, SLM 18 imprints a data page upon data light beam 12. In addition to being so modulated, data light beam 12 is also reflected by SLM 18 with the polarization of data light beam 12 being rotated upon reflection. The beam reflected by SLM 18 has orthogonal polarization with respect to that of the beam incident on SLM 18. The reflected beam is then transmitted through beam splitter 16 and incident upon lens 20. In the exemplary embodiment of FIG. 1, data encoding configuration uses a reflective SLM combined with requisite polarization optics, but other configurations may be employed for spatial encoding a data page and spatial light modulator 18 may also comprise a transmissive SLM placed directly in the optical path of data beam. Lens 20 is placed such that SLM and holographic recording medium 22 are centered in front and back focal plane of lens 20, producing a spatial Fourier transform of SLM image onto holographic recording medium 22 at location 24. Reference light beam 14 is directed upon holographic recording medium 22 at the same location 24. A holographic grating is formed by photo induced change in the index of refraction and/or the absorption of recording medium 22, said change being proportional to the spatially modulated intensity of the interference pattern produced by interference between data light beam 12 and reference light beam 14. Both data light beam 12 and reference light beam 14 are incident on recording medium 22 from side 26. It should be appreciated that other configurations for imaging the SLM 18 within holographic recording medium 22 may be employed to produce one of a exact image or a Fresnel image of the SLM instead of a Fourier image of the SLM. Data light beam 12 propagates to recording medium 22 along direction $d_1$ and reference light beam 14 propagates to recording medium 22 along direction proximate to $d_2$.

Still referring to FIG. 1, incident reference light beam 14 is configured by a system comprising mirror 32 and lenses 34 and 36. Incident reference light beam 14 is first reflected by mirror 30 upon mirror 32, and subsequently imaged by the combination of lenses 34 and 36 upon holographic recording medium 22. Preferably, lenses 34 and 36 are chosen to form a 4 f imaging system between mirror 32 and holographic data storage medium 22, such that the combination of mirror 32 and pair of lenses 34 and 36 acts as an angular scanning system for changing the angle of incidence $A_1$ while maintaining the position of incidence of reference beam 14 upon holographic data storage medium 22. Reference light beam 14 is typically a plane wave. In the present embodiment, the angle of incidence $A_1$ of recording reference beam 14 is used as a hologram address in that the angle of incidence of reference beam 14 determines the grating vector, i.e. the periodicity and orientation of the holographic grating formed by the interference between data light beam 12 and reference light beam 14. Transmitted reference light beam 38 is that portion of reference light beam 14 that is transmitted through recording medium 22 to bottom side 40. Transmitted reference light beam 38 propagates along direction $d_2$ passing through lens 42 and quarter wave plate 44. Quarter wave plate 44 changes the polarization of the transmitted portion 38 of transmitted reference light beam 14. Mirror 50 reflects the transmitted reference light beam 38 back along path 52. For convenience, the reflected beam is referred to as reflected reference light beam 54. Path 52 is the same path followed by transmitted reference light beam 38 from medium 22 to mirror 50. Reflected reference light beam 54 propagates along direction $d_4$ while heading towards recording medium 22. Direction $d_4$ is in the opposite direction to direction $d_2$. Quarter wave plate 44 has its principal axis oriented at 45° with respect to incident polarization, and reflection by mirror 50 causes the reflected reference light beam 54 after second transmission through quarter wave plate 44 to have a polarization orthogonal to the polarization of reference light beam 14 incident on medium 22 so that it will not interfere with either of the recording beams, i.e. data light beam 12 and reference light beam 14, and prevent recording of unwanted noise gratings. Reflected reference light beam 54 forms a counter propagating orthogonally polarized replica of recording reference beam when illuminating position 24 of holographic recording medium 22, thereby producing a reconstructed data light beam 60 propagating in a direction $d_3$ opposite to and with a polarization orthogonal to the direction and polarization of the data recording beam. Reconstructed data light beam 60 passes through lens 20 and is reflected by the beam splitter 16 onto detection system 70 by virtue of its orthogonal polarization to that of recording data light beam 12.

Additionally, the system also comprises an optical shutter 46 placed along path 52, preferably between lens 42 and mirror 50. Optical shutter 46 is generally closed to block transmitted reference light beam 38 during recording, and is opened only when performing real time data readout for data write verification purposes. The purpose of the shutter is to limit exposure of the medium by the back-reflected reference beam to that expressly necessary for real time data readout and write verification. The present embodiment produces real time reconstruction of the data page currently being recorded. As previously explained, the reconstruction data path is folded back along the same path as the data recording path up to polarization beam splitter 16. Polarization beam splitter 16 reflects the counter propagating and orthogonally polarized with respect to the recording data light beam reconstructed signal along a separate reflected path toward detection system 70. Examples of detection systems that may be used for detection system 70, include, but are not limited to full page detection and page integrated signal intensity detection, embodiments of which are described in a subsequent section of the invention.

Figure 2:
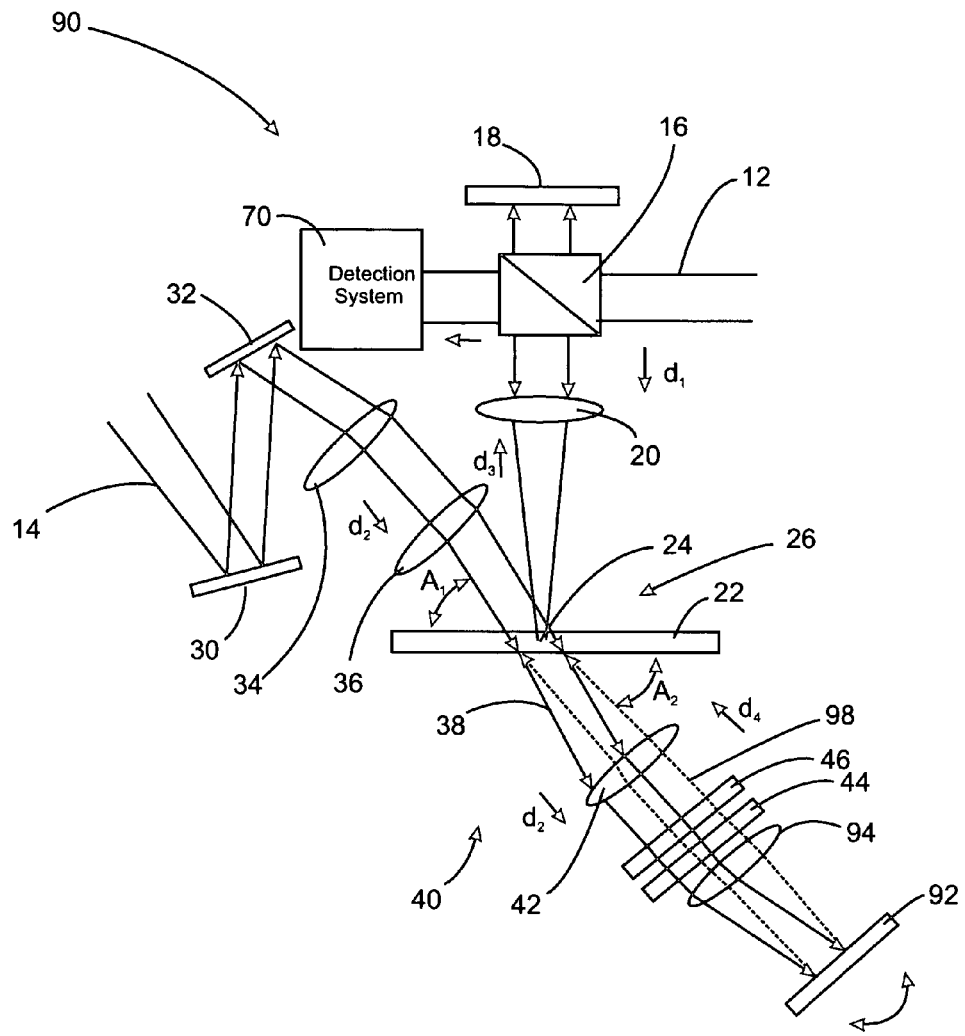
FIG. 2 is a schematic of an embodiment of the invention using a reflected reference light beam for write verification in which the angle of incidence of the reflected reference light beam is variable.

Now with reference to FIG. 2, a schematic of another embodiment of the invention using a reflected reference light beam for holographic real time data readout and write verification is provided. Holographic data recording system 90 includes a holographic recording system analogous to that set forth above for FIG. 1 in that the paths and components manipulating data light beam 12 and reference light beam 14 in performing the recording are the same. However, this embodiment employs a different reflective apparatus for reflecting transmitted reference light beam 38, such that transmitted reference light beam 38 is reflected back to the same location 24 of recording medium 22 with a different angle of incidence A2 than the first angle of incidence $A_1$. The reflective apparatus allows selection of a readout angular address different from that being used for recording, and, therefore, allows access to any selected page among the previously recorded pages. In this embodiment, any page previously recorded or being recorded may be read. As set forth above, the combination of mirror 32 and pair of lenses 34 and 36 acts as an angular scanning system for changing the angle of incidence $A_1$ while maintaining the position of incidence of reference beam 14 onto holographic data storage medium 22. A combination and configuration of elements identical to that used for forming the recording angular scanner is employed. A pair of lenses 42 and 94 is combined with mirror 92 to form a reflective angular scanner. Lenses 42 and 94 form a 4 f imaging system whereby transmitted reference light beam 38 is imaged upon mirror 92, which reflects back reflected reference light beam 98 through the same system to the same location 24 of recording medium 22. Mirror 92 is rotatable such that angle of reflection, and therefore reflected angle of incidence A2 is variable. Additional quarter wave plate 44 is placed between pair of lenses 42 and 94. As set forth above, quarter wave plate 44 and mirror 92 also act to rotate polarization, such that reflected reference light beam 98 incident upon holographic data storage medium has orthogonal polarization to that of transmitted recording reference light beam 38. Changing the orientation of the retro reflecting mirror 92 allows control of the angle of retro reflection of the recording beam, therefore of its angle of incidence upon the medium, thus controlling the angular address for holographic readout. Accordingly, readout angular address is controlled independently from the recording angular address of the page being recorded, allowing random access to any previously recorded page that you want to read out during recording.

Again with reference to FIG. 2, the system also comprises optical shutter 46 placed along path 98, preferably between lens 42 and lens 94. Optical shutter 46 is generally closed to block transmitted reference light beam 38 during recording, and is opened only when performing real time data readout for data write verification purposes. The purpose of the shutter is to limit exposure of the medium by the backreflected reference beam to that expressly necessary for real time data readout and write verification. The real time data readout and write verification method and optical system of the embodiment in FIG. 2 is more versatile than that in FIG. 1 in that all already stored pages are potentially accessible for readout and data write verification during data recording.

Figure 3A:
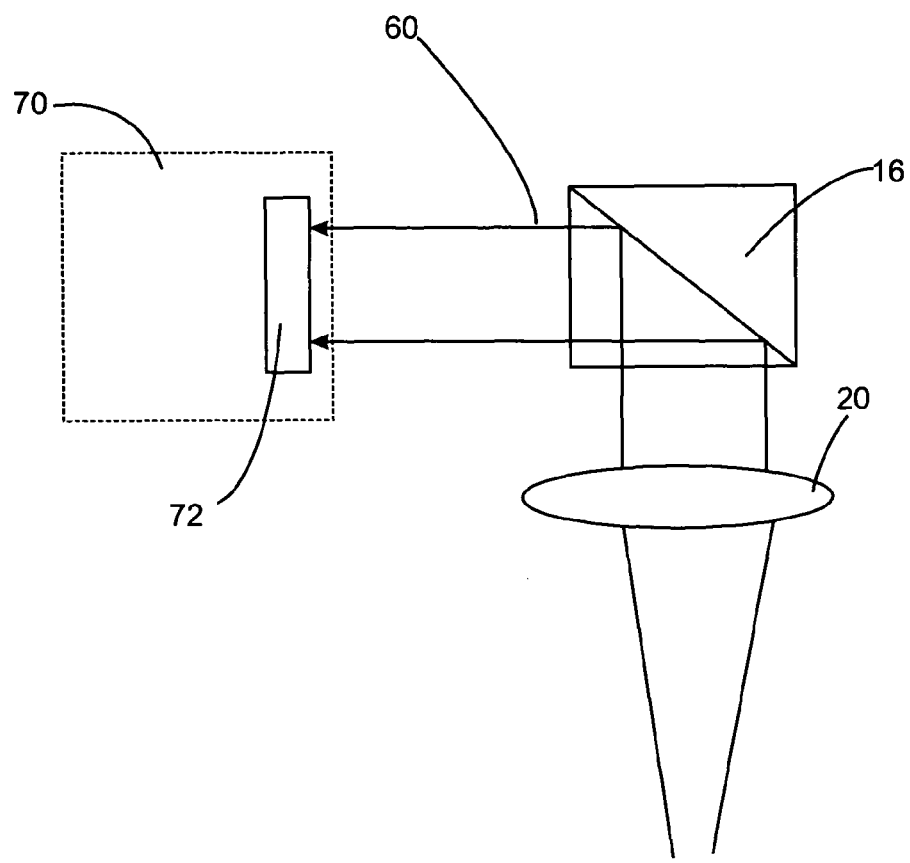
FIG. 3A is a schematic of an embodiment of the invention using a page detection scheme.
Figure 3B:
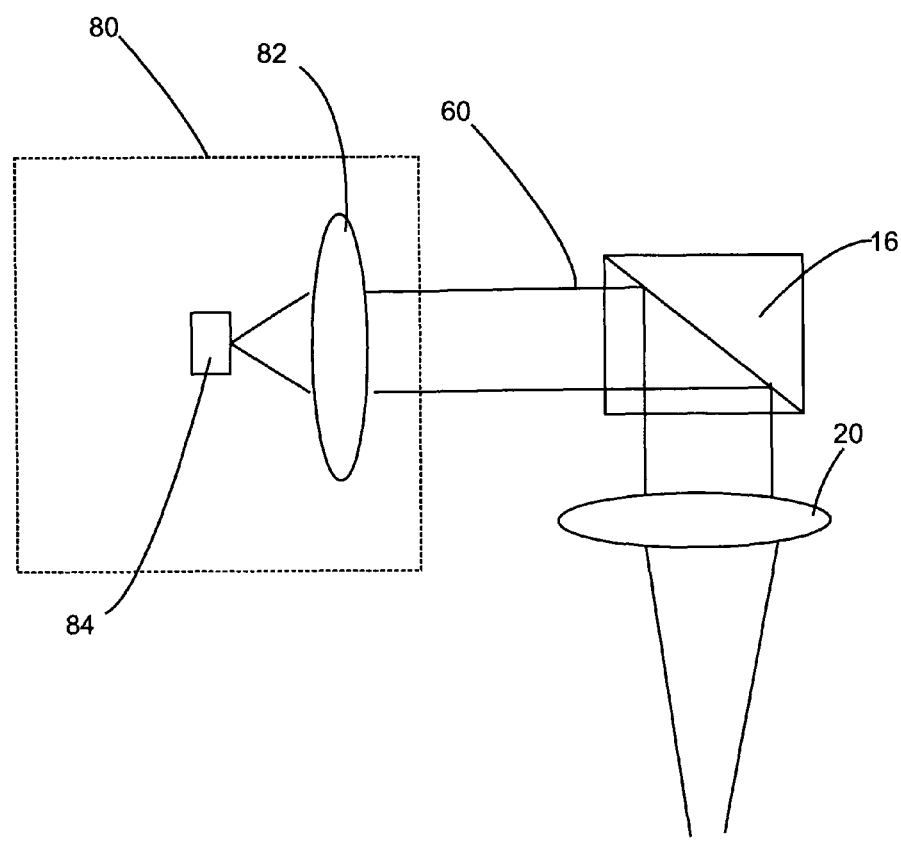
FIG. 3B is a schematic of an embodiment of the invention using an integrated signal detection scheme.
Figure 3C:
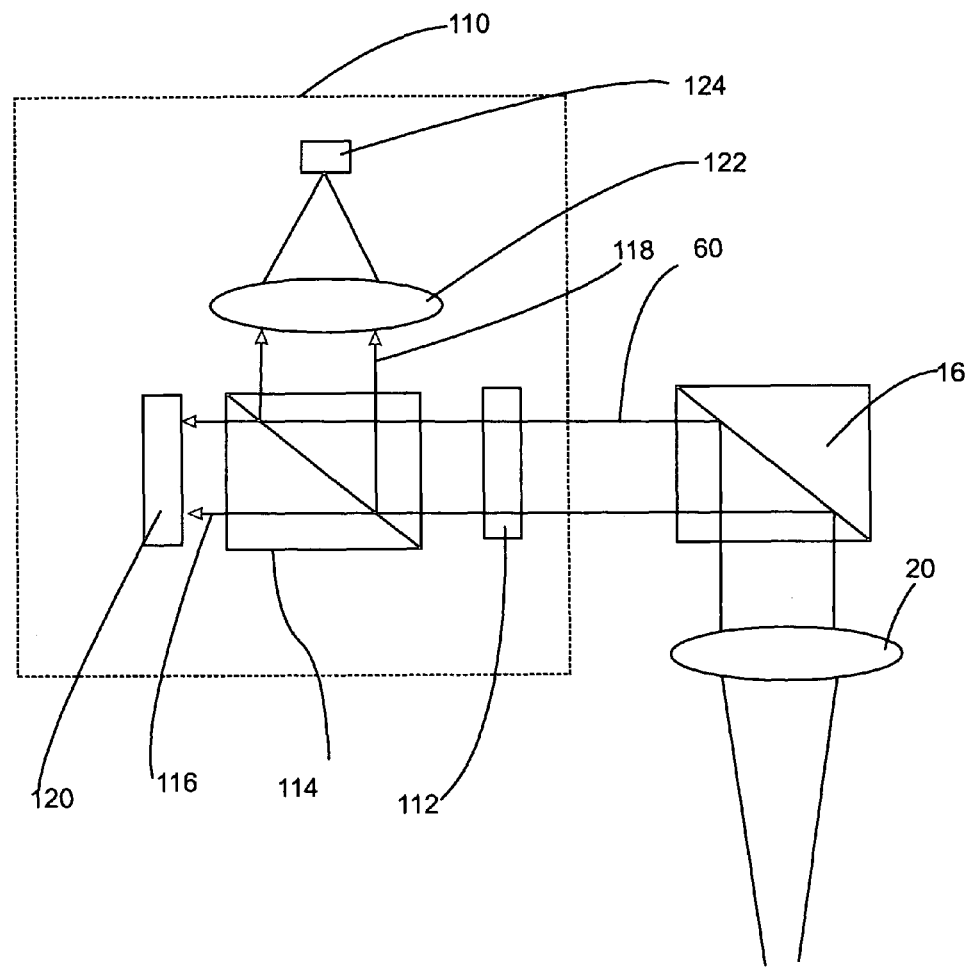
FIG. 3C is a schematic of an embodiment of the invention using an integrated signal detection scheme and a page detection scheme.

Let us now make reference to detection system 70 used in the embodiments of FIGS. 1 and 2. In certain embodiments of the invention, detection system 70 may comprise, in addition to detection means, imaging and other functional optical elements along the reflected path produced by polarization beam splitter 16. In other embodiments of the invention, detection system 70 may make use of imaging operations produced by optical elements placed along the common portion of recording and readout data paths. FIGS. 3A, 3B and 3C provide several exemplary embodiments of detection systems suitable for various embodiments of the invention. FIG. 3A provides an exemplary embodiment of a detection system suitable for bit level page detection, and generally designated by reference number 70. Detection system 70 comprises a photodetector array 72. Lens 20 acts to produce an image of the reconstructed data page at its back focal plane along the reflected by polarization beam splitter 16 path. Photodetector array 72 is placed in a plane coinciding with the image plane produced by lens 20 for detecting the holographically reconstructed image of the data page currently being recorded. Full page detection allows bit level verification or determination of single bit error rate level readout of the data page.

FIG. 3B provides an exemplary embodiment of a detection system suitable for page integrated intensity detection, and generally designated by reference number 80. Detection system 80 comprises lens 82 and a single element photodetector 84. Lens 82 is placed between polarization beam splitter 16 and photodetector 84, such that lens 82 focuses reconstructed beam onto single photodetector 84. Photodetector 84 detects simultaneously the spatially integrated intensity associated with all pixels of the SLM encoded data page, thereby allowing a reduced detection time due to the correspondingly higher signal intensity. Lens 82 is preferably placed such that its object focal plane coincides with the image focal plane of lens 20, although other positions may be employed in other embodiments of the invention. In certain embodiments lens 82 may have the same focal length as that of lens 20, in which case photodetector 84 detects the spatially integrated intensity of the image of the hologram being recorded. Page integrated intensity detection as in the present variation provides a fast measurement of the average signal to noise ratio of the page from which an average page bit error rate can be estimated. While this only provides an average signal to noise ratio, it provides a several orders of magnitude faster measurement, which reduces the readout energy exposure of the medium.

FIG. 3C illustrates yet another exemplary embodiment of a detection system suitable for providing both full page detection and page integrated intensity detection, and generally designated by reference number 110. With respect to FIG. 3C, a half wave plate 112 placed after first beam splitter 16 rotates the polarization of reconstructed beam 60 by an angle equal to twice the angle between principal axis of half wave plate 112 and polarization of reconstructed beam 60. Polarization beam splitter 114 transmits the p polarized component and reflects the s polarized component of polarization rotated reconstructed beam 60 along respective paths 116 and 118. Changing the orientation of half wave plate 112 is used to control the splitting ratio between transmitted path 116 and reflected path 118. Transmitted path 116 comprises a photodetector array 120 positioned at a back focal plane of lens 20 for detecting a reconstructed image of the SLM encoded data page. Reflected path 118 comprises lens 122 and single photodetector 124. Lens 122 focuses the reflected by polarization beam splitter 114 portion of the reconstructed signal beam 60 onto single photodetector 124 for page-integrated signal detection. As is readily understood in reference to FIGS. 3A and 3B, elements and configurations of transmitted path 116 and reflected path 118 are generally analogous to and perform the same functions as those of FIGS. 3A and 3B, respectively.

While FIGS. 3A, 3B and 3C illustrate several embodiments of detection systems suitable for use in the present invention, other embodiments are possible which may comprise variations based on one of the exemplary embodiments without departing from the scope or spirit of the invention. For example, and with respect to FIG. 3B, yet another exemplary embodiment comprises using a photodetector array for detecting the intensity of the focused reconstructed beam in lieu of single element photodetector 84. Photodetector array comprises a plurality of photodetector elements advantageously sized and disposed such that the focused reconstructed beam illuminates the plurality of the photodetector elements. As previously explained, the hologram being recorded and its reconstructed image correspond to the Fourier transform image of the data page encoded by SLM 18. Consequently, each photodetector element of the photodetector array detects the intensity associated with a different set of spatial frequencies contained in the Fourier hologram being recorded. Differences in intensity levels between photodetector elements provide an indication of non uniformity in diffraction efficiency as a function of spatial frequency, and conversely of variations in recording efficiency within the data page. This may prove advantageous for systems requiring fast but also sub page block level write verification.

Different embodiments of the invention comprise different combinations of detection schemes illustrated in FIG. 3A C with the holographic real time data readout and write verification embodiments described with reference to FIGS. 1 and 2. However, as set forth above, the different detection methods, as well as the different readout configurations employed, each provide different functionalities and capabilities. Accordingly, while the different combinations each provide real time data readout and write verify functionalities with significant gain in optical power usage efficiency, certain combinations may be more advantageous in terms of achieving other main objectives set forth in the invention, namely those of limiting the degradation in storage system and media performance potentially incurred as a result of data write verification, said degradation manifested by at least one of loss of effective recordable capacity or degradation in write transfer rate. For example, with reference to page detection system of FIG. 3A, for data storage systems with substantially equivalent internal data write and data read transfer rates, exposure time necessary for page detection to determine single bit error rate may still cause significant degradation of sensitivity and of remaining capacity of the recording medium.

Considering now the integrated page signal detection scheme of FIG. 3B, this system, as set forth previously, offers the advantage of very rapid detection of an average signal to noise of a data page, the reduced exposure of recording medium 22 to light resulting in less material consumption during readout. Due to the spatial integration over the large number of data page pixels occurring at the detection, spatially integrated page readout times can be multiple, at least three, orders of magnitudes less than the page recording time, rendering the degradation effects due to readout during recording essentially insignificant. Furthermore, intra page recording efficiency variations associated with the optical recording system can be characterized as part of the normal testing of the holographic storage drive, and may be used as a known input for indirect interpolation of worst case single bit-error rate from the average page signal to noise ratio. However, this method may not provide sufficient precision to discriminate between average page signal to noise ratio levels proximate to a pass fail threshold value.

Based on the above discussion, the detection system providing both full page detection and page integrated intensity detection and illustrated in FIG. 3C combines the advantageous features of both systems and constitutes a preferred embodiment of the invention, by allowing the following advantageous data verification process, namely performing a first detection step of all the pages using integrated page detection; once the full set of data pages is read and their average signal to noise are evaluated, a determination is made as to the necessity of second verification step, the second verification step comprising a second readout using full page detection of the page exhibiting the lowest signal to noise to verify that all the recorded data pages have a bit level error rate within specification. Specifically, if the signal with the lowest integrated signal to noise level has the correct bit level detection then all the other data pages are most likely also within specification. It should be understood that many variations of this verification process are possible, such as a second step comprising full page verification of each of the at least one page exhibiting an average signal to noise ratio proximate to the pass fail threshold value.

In another embodiment of the present invention, a holographic data recording system using a reflected data light beam for holographic write verification is provided. The nature of the holographic recording process in which interference between data light beam 12 and reference light beam 14 is used to produce a holographic grating that is modulated by a data pattern entails that both data light beam 12 and reference light beam 14 as well as their counter propagating counterparts are capable of reading out the holographic grating since each is matched to the grating. In the same manner that the reference light beam may be used to reconstruct the data, the data light beam may be analogously used to reconstruct the reference light beam. The resulting reconstructed reference light beam may be detected to quantify the efficiency of recording.

Furthermore and as set forth above, multiple data pages are sequentially recorded at a same location 24 within holographic recording medium 22 as part of the holographic recording process. Each of these page holograms associates a different angular address corresponding to a variable incident angle of a reference light beam with a different data page pattern encoded upon data light beam 12 by means of the SLM 18. The data light beam 12 itself remains otherwise fixed in terms of its incidence upon recording medium, and thus is generally matched to each recorded hologram at data location 24 of recording medium 22. For ease of explanation, the precise degree of matching or correlation is directly proportional to the degree of similarity between an illumination data pattern and each recorded data pattern. Accordingly, when illuminated with a data light beam, each recorded holographic grating will produce a reconstructed reference light beam to which it is associated. Specifically, readout with a data light beam simultaneously reconstructs all of the angularly dispersed reference light beams. The intensity of the each reconstructed reference light beams is proportional to the match, or degree of similarity, between the data pattern in the data light beam used for readout, and its associated data pattern stored in location 24 of recording medium 22. The degree of similarity is proportional to the square of the inner product between readout data pattern and stored pattern.

Figure 4:
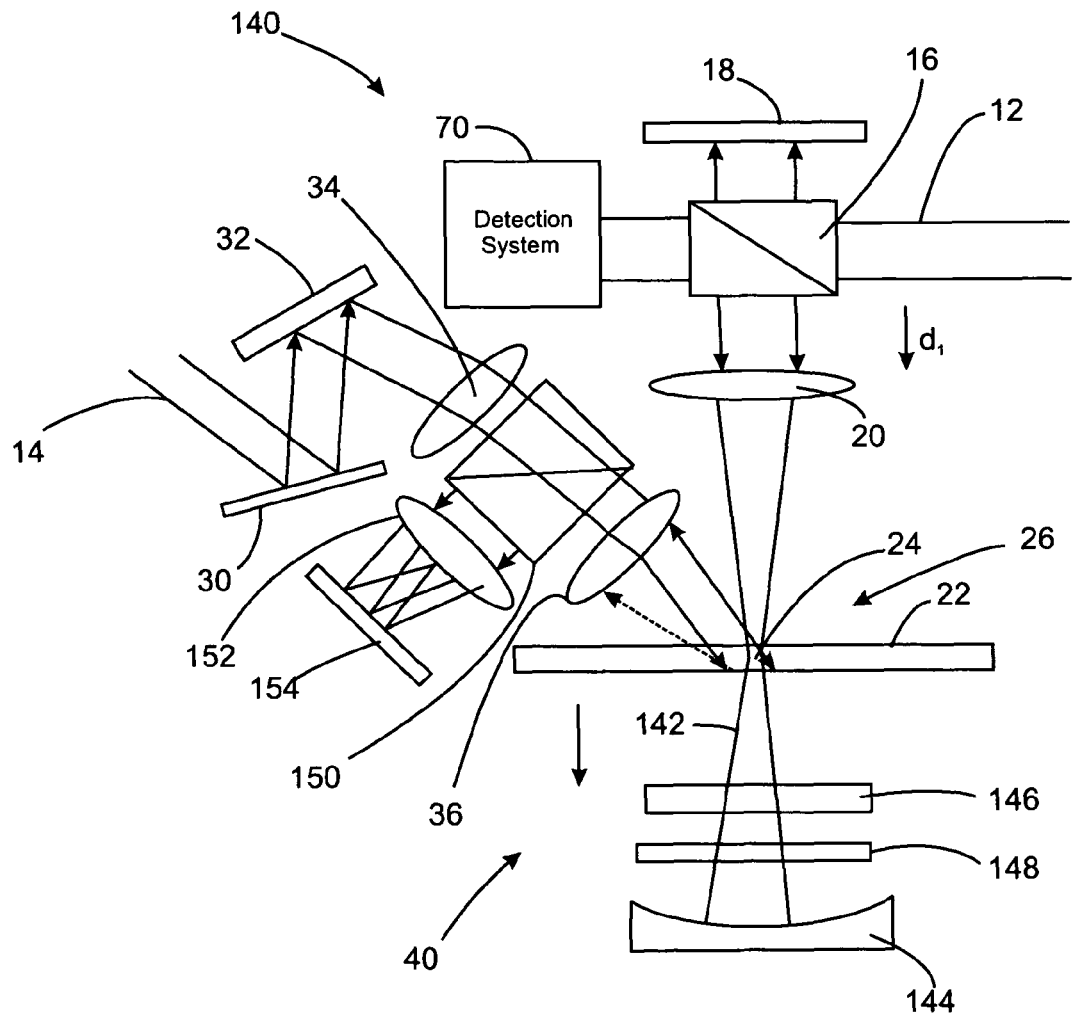
FIG. 4 is a schematic of an embodiment of the invention using a reflected data light beam for write verification.

With reference to FIG. 4, a schematic of the present embodiment using a reflected data light beam for holographic write verification is provided. Holographic data recording system 140 focuses data light beam 12 onto recording medium 22 as set forth above for FIGS. 1 and 3. Reference light beam 14 is imaged onto medium 22 also as described for FIGS. 1 and 3 except that now polarization beam splitter 150 is interposed between lenses 34 and 36. It should be appreciated that data light beam 12 is focused within recording medium 22 as part of the recording process whereas the reference light beam 14 is typically a plane wave. After the recording medium 22, data light beam 12 diverges and is referred to on bottom side 40 as transmitted data beam 142.

Therefore, a curved mirror 144 is used to reflect back transmitted data light beam 142 onto itself. Typically, curved mirror 144 is a spherical mirror placed at a distance from recording medium 22 equal to its radius of focus. Quarter wave plate 146 is used to produce a polarization of back reflected data light beam orthogonal to that of transmitted light beam 142. Shutter 148 is generally used to block the data light beam during the recording process, except when data write verification is required. After all the pages have been recorded, or alternatively during the recording process if immediate readout or verification is required, shutter 148 is opened for data readout and verification. As set forth above, the reflected data page beam used for readout is matched to all recorded holograms, resulting in a set of diffracted signals along the same path as the set of recording reference light beams, however counter propagating and of orthogonal polarization to that of recording light beams. Accordingly, polarization beam splitter 150 reflects the set of reference light beams onto a detection system. For example, the set of reference light beams are then collected and focused by lens 152 into separate focused spots. A photodetector array 154 placed in the plane of focus of lens 152 comprises a plurality of photodetector elements capable of independently detecting each different focused reconstructed reference light beam incident upon a different photodetector element. Accordingly, the different signal levels associated with each page are simultaneously detected. Note that other imaging and detection configurations are possible.

As set forth above, the intensity of each reconstructed reference beam signal is proportional to the square of the inner product between readout data pattern and stored pattern. It is also known that signal intensity for correlative readout is proportional to single pixel intensity for data page readout, with a proportionality factor equal to the ratio of the number, squared, of matching pixels by the total number of pixels within a page, therefore potentially enabling a vastly reduced detection time when utilizing a readout data pattern with a high degree of similarity with a stored data page. Preferably the readout pattern should display a constant and high degree of similarity with all the stored data pages. In a refinement of this embodiment, the data readout page is insured of having the same degree of correlation to all the stored data patterns by using a uniform data page encoding in the data light beam used for readout (and therefore verification). Although each of the data patterns stored as a data page in the recording medium may be different, each data page typically has the same ratio of on and off bits. Therefore, if the data pages are illuminated with a page having everything on, there is substantially the same correlation in each of the pages even though different patterns are stored. The intensity of the diffracted reference light beam will only be proportional to the actual recording efficiency of each data pattern. This is used to verify the signal level for all the pages simultaneously.

Figure 5:
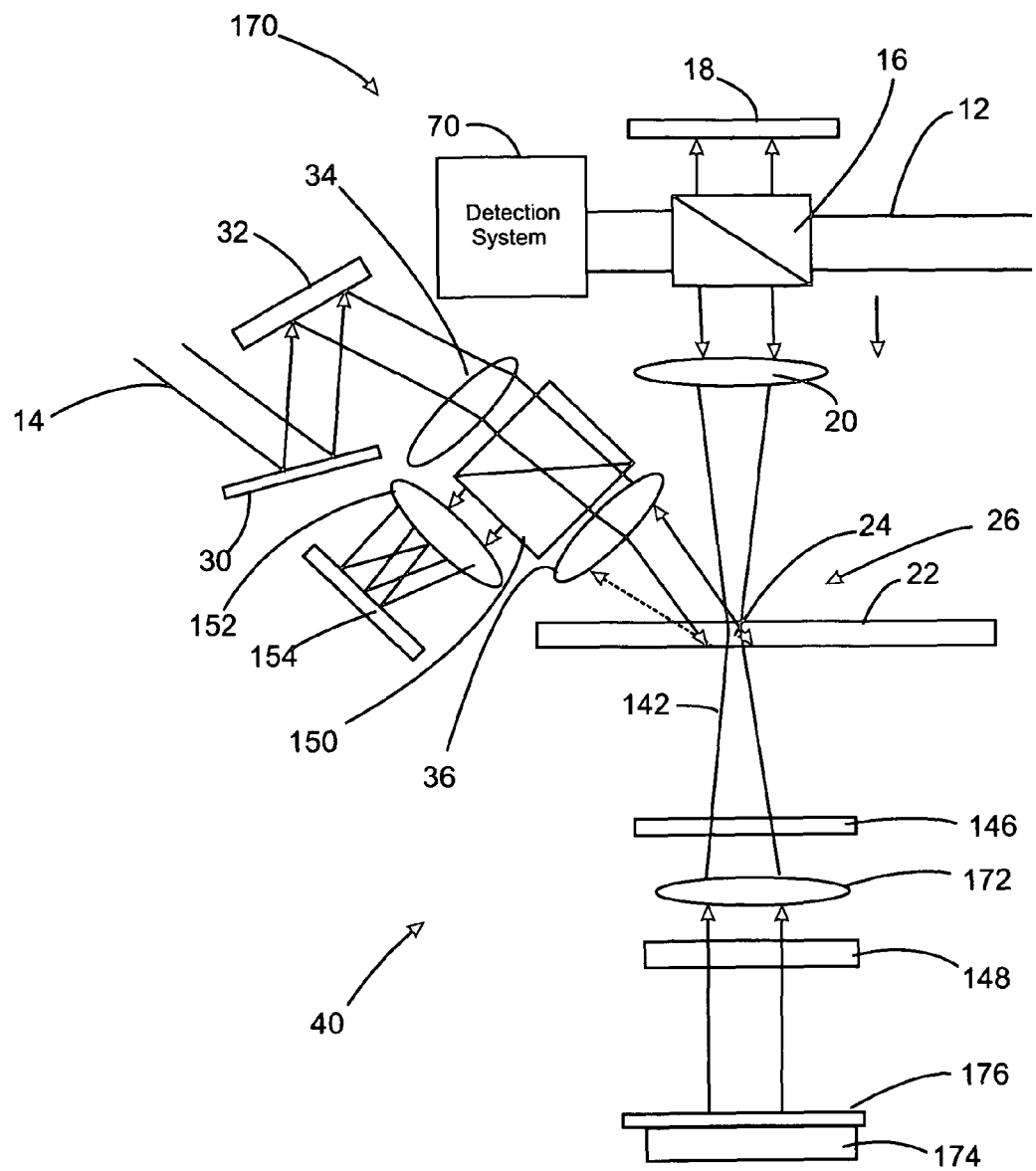
FIG. 5 is a schematic of an embodiment of the invention using a reflected data light beam for write verification with a verification filter.

With reference to FIG. 5, a schematic of another embodiment of the invention using a reflected data light beam for holographic write verification is provided. Holographic data recording system 170 comprises a somewhat different configuration than that described in FIG. 4 in that lens 172 is added on the bottom side 40 of recording medium 22 and that curved mirror 144 is replaced by plane mirror 174. Lens 172 is placed in analogous position to that of lens 20 used on the recording side, and produces a transmitted image of the data page encoded by SLM 18 on mirror 174.

In a practical system, one must be able to detect and compensate for the inevitable variations due to system tolerances and also variations between different systems, the net effects being global shifts in the page signal position as well as intra page variations. In the different data pages, it is beneficial to assign certain blocks within the data page as reference blocks. Such reference blocks can be detected during page based readout and used to identify if the page has shifted or been distorted. By measuring the distortion, an algorithm can be used to rearrange all the bits within the detected page correctly. If reference marks are incorporated in the data page, the same reference blocks are used in every data page to realign the actual data bits upon readout. The same reference blocks are used on all the data pages. Again with reference to FIG. 5, a verification filter 176 placed between lens 172 and mirror 174 transmits only the reference marks that have been encoded on the data pages. During readout, only the reference blocks are reflected back. These reference blocks constitute a known pattern inscribed on all of the pages, and therefore produce an equal degree of correlation to all recorded pages. Verification filter 176 enables to produce, from any given recording data pattern, a reflected reference pattern comprised of the reference blocks, thus allowing simultaneous readout during recording. Data verification may be done at any time during the recording of the at least one of plurality of pages being recorded to location 24 of recording medium 22. However, in order to minimize capacity loss due to photoactive species consumption during readout and also the number of verification steps required, the data verification is preferably performed during the recording of the last data page. During recording of the last page, the shutter can be opened such that verification filter 176 will filter out the data page and create a reference block data page. Therefore, during recording of the last page, a simultaneous readout of all the previously recorded pages plus the one being recorded is obtained.

In yet another embodiment of the present invention, at least one of the transmitted beams is reflected and directed onto at least one region different from a current recording region of the holographic data storage medium for performing additional photo-induced processing functions required by the holographic data storage medium. The at least one different region of the holographic recording medium illuminated by at least one reflected light beam may comprise one of a previously unexposed region or a fully recorded region of the holographic data storage medium that may require one of optical exposure for pre sensitization in preparation for holographic recording of data and optical exposure for depletion of remaining optical active elements after holographic data recording. This embodiment provides a significant improvement by providing for concurrent data recording and photo processing of different regions of the recording medium without requiring additional optical power or light sources as well as providing processing and data recording using light of similar wavelength.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of holographic data recording using a data light beam having data encoded thereon and a reference light beam with the data light beam and the reference light beam directed to a recording location on a holographic recording medium containing optically active elements such that a holographic grating is formed by the interference between the data light beam and the reference light beam, wherein the reference light beam is incident on the holographic recording medium with a first angle of incidence and wherein at least a portion of the reference light beam is transmitted through the recording medium, the method comprising:

reflecting the transmitted portion of the reference light beam back to the data recording location at a second angle of incidence independently controllable relative to the first angle of incidence to form a reflected light beam incident from an opposite side of the holographic recording medium to produce at least one reconstructed light beam;

controlling the second angle of incidence of the reflected light beam relative to the opposite side of the holographic recording medium at the data recording location to select data for verification; and detecting the at least one reconstructed light beam during the holographic data recording to perform data verification with the reconstructed light beam.

2. The method of claim 1 wherein the polarization of the reflected light beam is adjusted to be substantially orthogonal to the polarizations of the data light beam and the reference light beam at the data recording location.

3. The method of claim 1 wherein illumination of the recording medium by the reflected light beam produces a reconstructed light beam containing a reconstructed data page for data verification.

4. The method of claim 1 wherein detecting comprises a detection method selected from the group consisting of full page detection, page-integrated signal detection, or a combination thereof.

5. The method of claim 1 wherein the reflected light beam is incident on the opposite side of the holographic recording medium with a second angle of incidence that is substantially the same as the first angle of incidence such that the data selected for verification is the data currently being recorded.

6. The method of claim 1 wherein controlling comprises controlling the second angle of incidence so that the second angle of incidence is different from the first angle of incidence to select previously recorded data for verification.

7. The method of claim 1 wherein an optical shutter is operable for controlling the exposure time of the data recording location to the reflected light beam.

8. The method of claim 1 further comprising:
illuminating at least one region different from the current recording region of the holographic recording medium with the reflected reference light beam for performing photo-induced processing of the recording medium.

9. The method of claim 1 further comprising:
illuminating at least one previously unexposed region different from the current recording region of the holographic recording medium with the reflected reference light beam for pre-sensitization of the at least one region in preparation for holographic recording of data.

10. The method of claim 1 further comprising:
illuminating at least one region different from the current recording region of the holographic recording medium with the reflected reference light beam for depletion of the optically active elements of the recording medium.

11. A holographic data recording system for holographically recording data to a recording medium, the holographic data recording system comprising:
a light beam source that produces a data light beam and a reference light beam;
a data encoding apparatus for encoding data on the data light beam;
an imaging system that images the data light beam and the reference light beam on a data recording location of the recording medium; and a reflective system that reflects a transmitted portion of the reference light beam back upon the recording medium with a polarization that is orthogonal to the polarizations of the data light beam and the reference light beam to form a reconstructed light beam to be used for real time data verification, wherein the reflective system controls the angle of incidence of the reflected reference light beam relative to the recording medium independently of the angle of incidence of the reference light beam on the opposite side of the recording medium.

12. The holographic data recording system of claim 11 wherein the reflective system comprises a reflective mirror, at least one imaging element and a polarization element.

13. The holographic data recording system of claim 12 wherein the reflective mirror is controlled to change the angle of incidence of the reflected reference light beam upon the recording medium independently relative to the angle of incidence of the reference light beam.

14. The holographic data recording system of claim 11 wherein the reflective system further comprises a shutter that is closed to block the reflected reference light beam during recording and opened to perform real time data readout for data write verification.

15. A method of holographic data recording using a data light beam having data encoded thereon and a reference light beam, the data light beam and the reference light beam being directed to a recording location on a holographic recording medium containing optically active species with the reference light beam incident on the holographic recording medium with a first angle of incidence, the method comprising:
    illuminating an opposite side of the holographic recording medium during recording using at least a portion of the reference light beam directed at the opposite side of the holographic recording medium at a second angle of incidence, wherein the second angle of incidence is varied independently relative to the first angle of incidence.

16. The method of claim 15 further comprising:
    detecting a reconstructed light beam formed by a portion of the reference light beam transmitted through the recording location and redirected to the opposite side at the second angle of incidence to perform data verification of data currently being written.

17. The method of claim 15 wherein illuminating comprises:
    illuminating at least one previously unexposed region different from the current recording region of the holographic recording medium with the at least a portion of the reference light beam for pre-sensitization of the at least one previously unexposed region in preparation for holographic recording of data.

18. The method of claim 15 wherein illuminating comprises:
    illuminating at least one region different from the current recording region of the holographic recording medium with the at least a portion of the reference light beam for depletion of the optically active species of the recording medium.

19. The method of claim 15 wherein illuminating comprises:
    reflecting the at least a portion of the reference light beam transmitted through the holographic recording medium to the opposite side of the holographic recording medium.

* * * * *